US008126671B2

(12) United States Patent
Finkler

(10) Patent No.: US 8,126,671 B2
(45) Date of Patent: Feb. 28, 2012

(54) MEASUREMENT SYSTEM AND METHOD FOR MONITORING A MEASUREMENT SYSTEM

(75) Inventor: Roland Finkler, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 367 days.

(21) Appl. No.: 12/355,285

(22) Filed: Jan. 16, 2009

(65) Prior Publication Data
US 2010/0017162 A1    Jan. 21, 2010

(30) Foreign Application Priority Data
Jan. 18, 2008    (EP) ..................... 08000962

(51) Int. Cl.
G01C 17/38    (2006.01)
G06F 19/00    (2011.01)
(52) U.S. Cl. ........... 702/94; 702/104; 702/105; 702/106
(58) Field of Classification Search .................... 702/94, 702/81–84, 104–107
See application file for complete search history.

(56) References Cited

FOREIGN PATENT DOCUMENTS

| | | | |
|---|---|---|---|
| DE | 27 29 697 A1 | | 1/1979 |
| DE | 2729697 | * | 1/1979 |
| DE | 35 86 937 T2 | | 6/1993 |
| DE | 20 2004 000 413 U1 | | 4/2004 |
| EP | 0 158 781 A1 | | 10/1985 |
| EP | 0158781 | * | 10/1985 |
| EP | 0 362 407 A1 | | 4/1990 |
| EP | 0362407 | * | 4/1990 |
| EP | 0 431 195 A1 | | 6/1991 |
| EP | 1 205 728 A2 | | 5/2002 |
| JP | 63-300911 A | | 12/1988 |

* cited by examiner

Primary Examiner — Andrew Schechter
Assistant Examiner — Phuong Huynh
(74) Attorney, Agent, or Firm — Henry M. Feiereisen; Ursula B. Day

(57) ABSTRACT

A measurement system has a transmitter for determining the position of a movable element, and a first energy store which, in the event of failure of an external electrical supply unit of the transmitter, supplies at least a part of the transmitter with electrical power such that a stored count of the transmitter is maintained in the event of failure of the external electrical supply voltage. The first energy store produces a first auxiliary supply voltage, wherein a first data item is stored in the transmitter when a reference mark of the transmitter is detected for the first time. The first data item is deleted in the event of failure of the external electrical supply voltage for the transmitter and failure of the first auxiliary supply voltage for the transmitter. As a result, an incorrectly determined position resulting from a failure of the electrical power supply for the transmitter can be identified.

25 Claims, 3 Drawing Sheets

MEASUREMENT SYSTEM AND METHOD FOR MONITORING A MEASUREMENT SYSTEM

CROSS-REFERENCES TO RELATED APPLICATIONS

This application claims the priority of European Patent Application, Serial No. 08000962, filed Jan. 18, 2008, pursuant to 35 U.S.C. 119(a)-(d), the content of which is incorporated herein by reference in its entirety as if fully set forth herein.

BACKGROUND OF THE INVENTION

The present invention relates to a method for monitoring a measurement system, wherein the measurement system has a transmitter for determining the position of a movable element. The invention also relates to a measurement system wherein the measurement system has a transmitter for determining the position of a movable element.

These measurement systems are used to determine a position of a movable element, such as a motor shaft of a drive that drives the machine shaft, particularly in the technical field of automation engineering, incremental measurement systems in particular. In an incremental measurement system a sensor detects a reference mark and, after it moves over the reference mark, it can determine an absolute position because the increments that have been moved over can be counted without any gaps by means of a counter after moving over the reference mark (zero position). The count of the increments which have been moved over in this case corresponds to a rough position, with a fine position then being determined by interpolation, for example as described in DE 27 29 697 A1. The rough position and the fine position together provide the absolute position.

Particularly in the case of machine tools, production machines and/or robots, measurement systems such as these are usually supplied during normal operation with electrical power from an open-loop and/or closed-loop control device that controls movable elements of the machine. In many such measurement systems, if the open-loop and/or closed-loop control device is switched off, the count for the increments which have been moved over is then lost, and/or increments which are moved over after it is switched off are no longer included in the count. Once the open-loop and/or closed-loop control device has been switched on again, the reference mark must be moved over again in measurement systems such as these, before the absolute position can be determined.

According to the prior art, however, this problem can be solved by providing a battery to supply power to the measurement system even after the open-loop and/or closed-loop control device has been switched off. One example of such measurement system is described in EP 0 362 407 A1. In this example, power is not supplied to all the electrical components of the transmitter. Only a part of the transmitter is supplied with electrical power and, to this extent, the transmitter is operated in an energy-saving mode rather than in the normal mode. Electrical power can be supplied only to a single RAM, for example, for storing the count. In that case, however, any movements of the movable element when the open-loop and/or closed-loop control device is switched off can then not be detected.

Alternatively, it is also possible for a light-emitting diode of an optical transmitter that is otherwise operated continuously to be operated only on a pulsed basis, and for the interpolation electronics not to be operated at all. This results in the fine position no longer being detected at all, or no longer being detected as well as it normally would be, but this is still sufficient to count the increments moved over. Such transmitters are further described in DE 35 86 937 T2 and EP 0 158 781 A1.

if the power supply is inadequate, in the event of failure of the battery this prior art has the disadvantage that the count of the elements that have been moved over can be deleted or changed. In particular, this can occur in the event of an excessively long failure of the external power supply that ensures the power supply for the transmitter during normal operation. Once the open-loop and/or closed-loop control device has been switched on again, and therefore after the external electrical supply voltage for normal operation of the transmitter has been restored, there is then no longer any guarantee that the position determined by the transmitter will actually match the actual position of the movable element, because, in the meantime, the auxiliary supply voltage provided by the battery will have fallen too far to supply adequate power to the important electrical components of the transmitter.

As another alternative, DE 20 2004 000 413 U1 discloses a transmitter in which an electromechanical snap-action mechanism serves as an independent energy source and non-volatile memory is used to store the count. The relatively greater complexity of this mechanism is disadvantageous, among other things.

It would therefore be desirable and advantageous to provide an improved system and method for identifying incorrect position determinations that are the result of a power failure in a transmitter's electrical power supply that obviates these prior art shortcomings.

SUMMARY OF THE INVENTION

According to one aspect of the present invention, a method for monitoring accuracy of a measurement system having a transmitter to determine a position of a movable element, and a first energy store to supply a first auxiliary supply voltage to at least a part of the transmitter so that a count stored by the transmitter for determining a position of the movable element is maintained when an external electrical supply voltage supplied to the transmitter fails, includes the steps of storing a first data item when a reference mark is detected for the first time by the transmitter, and deleting the stored first data item when the external electrical supply voltage and the first auxiliary supply voltage fail.

According to another aspect of the present invention, a measurement system includes a transmitter storing a count representative of a position of a movable element, with the transmitter being constructed to store a first data item when a reference mark is detected for the first time by the transmitter, and a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail.

According to another advantageous feature of the present invention, once the external electrical supply voltage has been restored, the first data item can be transmitted from the transmitter to a monitoring unit. The monitoring unit then advantageously can compare that first data item to a second data item such that if the first data item does not match the second data item an incorrectly determined position is identified. It has been found that this provides and advantageously reliable identification of an incorrectly determined position.

According to another advantageous feature of the present invention, once the external electrical supply voltage has been restored, if a deleted first data item is present, the determined position can be transmitted with an incorrect checksum to a monitoring unit. The checksum is checked by the monitoring unit, and if it is identified as being incorrect, an incorrectly determined position is identified. This has been found to identify an incorrectly determined position of the transmitter in an advantageously simple manner.

Furthermore, it has been found to be advantageous if the first data item is provided in the form of a bit. This represents a particularly simple embodiment of the data item.

According to another advantageous feature of the present invention, the second data item may be transmitted to the transmitter and, when a reference mark of the transmitter is detected for the first time, the second data item can be stored as the first data item in the transmitter. It has been found that this measure advantageously ensures simple adjustment of the first and second data items—when a machine is set up for the first time for example. For example, the serial number of the open-loop and/or closed loop control device may be provided as the second data item.

In particular, it has been found to be advantageous to provide a monitoring unit that is a component open-loop and/or closed-loop control device that controls the movable element. There is then no need for additional hardware for the monitoring unit.

According to another advantageous feature of the present invention, the first data item may be transmitted together with the determined position, within a data message for example. This has been found to be advantageous since the data item is then transmitted together with that determined position, which allows the first data item to be transmitted in a simple manner.

According to another advantageous feature of the present invention, in the event of failure of the external supply voltage for the transmitter, at least a part of the transmitter can be additionally supplied with electrical power from the first energy store so that increments which have been moved over are counted. This has been found to be advantageous since the count is then still correct even if the movable element moves during a failure of the supply voltage.

According to another advantageous feature of the present invention, once the external electrical supply voltage has been restored, the first data item is transmitted from the transmitter to the monitoring unit so that the monitoring unit can compare the first data item with a second data item. It has been found to be advantageous since the monitoring unit then identifies an incorrectly determined position if that first data item and the second data item do not match.

According to another advantageous feature of the present invention, once the external electrical supply voltage has been restored, if a deleted first data item is present the determined position is transmitted with an incorrect checksum to a monitoring unit so that the checksum can be checked by the monitoring unit. This has been found to be advantageous since the monitoring unit identifies an incorrectly determined position if it determines that the checksum is incorrect. Thus, an incorrectly determined position of the transmitter is identified in a simple manner.

According to another advantageous feature of the present invention, the measurement system may have a second energy store that provides the power to delete the first data item. This has been found to be advantageous as a simple way to ensure that power is supplied for deleting the first data item.

It has been found to be advantageous for a machine tool, a production machine and/or a robot to have a reliable, fault tolerant measurement method and system constructed and operated in accordance with the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
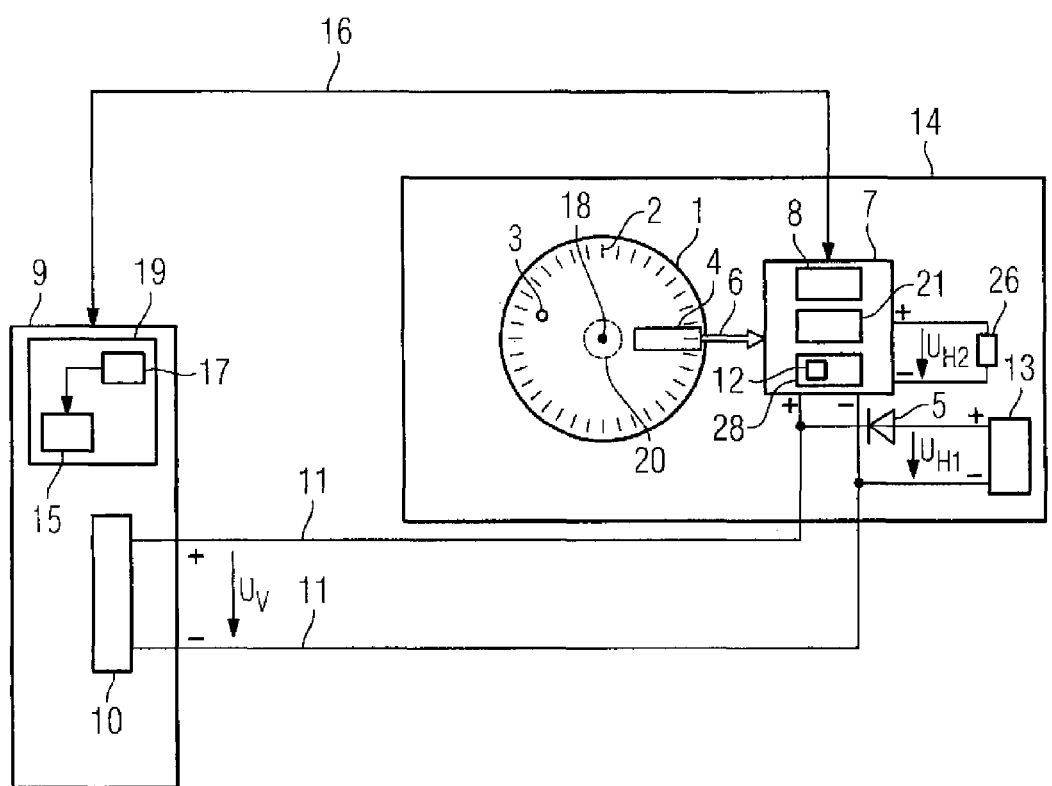
FIG. 1 is a schematic representation of a measuring system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic representation of a measuring system according to the present invention. For sake of clarity, only those elements which are necessary for understanding of the invention are illustrated. In this case, a transmitter 14 has a disk 1 whose rotation axis 18 is connected to a movable element which, for the purposes of the exemplary embodiment, is in the form of a motor shaft 20. The transmitter 14 in this way measures the position, that is to say, for the purposes of the exemplary embodiment, the rotation angle of the motor shaft 20. For this purpose, the transmitter 14 has an incremental track which is composed of increments arranged in a circular shape. By way of example, one increment is provided with the reference symbol 2 in the figure. The disk 1 is also provided with a reference mark 3. When the disk 1 carries out a rotary movement, a sensor system 4 registers that the reference mark 3 has been passed through, registers that the increments have been passed through, and transmits this to an evaluation unit 7, as is indicated by an arrow 6. The increments that have been passed through are counted by a counter 21, and the count is stored in a memory 8. The position of the motor shaft 20 can then be determined on the basis of the count and, for example, can be transmitted via a connection 16 to an open-loop and/or closed-loop control device 9, which is used for open-loop and/or closed-loop control of the position of the movable element.

In order to supply power during normal operation of the transmitter, the measurement system has a voltage production device 10 which produces an external electrical supply voltage U, in order to supply power to the transmitter 14, and supplies the transmitter 14 with power externally, via voltage supply lines 11. The voltage supply device 10, for the purposes of the exemplary embodiment, is a component of the open-loop and/or closed-loop control device 9. However, this need not necessarily be the case, and instead the voltage production device 10 may also be arranged outside the open-loop and/or closed-loop control device 9, and independently of the open-loop and/or closed-loop control device 9.

Furthermore, the transmitter 14 has a first electrical energy store 13 which, for example, may be in the form of a battery or a capacitor, or a combination of both. The first energy store 13 produces a first auxiliary supply voltage Um. If the external electrical supply voltage Uv fails, at least a part of the transmitter is supplied with electrical power by the first energy store 13 for a certain time period, such that the stored count of the transmitter in the memory 8 is maintained. The first energy store 13 is in this case electrically decoupled from the voltage production device 10 via a decoupling diode 5. If the external supply voltage Uv fails, the first auxiliary supply voltage UM is applied to the supply lines 11, ignoring the voltage drop across the decoupling diode 5.

If the voltage production device 10 fails or is switched off for a relatively long time, and the first energy store 13 is in consequence increasingly emptied, the first auxiliary supply voltage$_{UH1}$ decreases over time. When the first auxiliary supply voltage UH1 has fallen below a critical value (if the first auxiliary supply voltage UHI falls below a critical value, this represents a failure of the first auxiliary supply voltage), the count in the memory 8 is lost, that is to say it is deleted or changed. This results in an incorrectly determined position, which is not noticed by the open-loop and/or closed-loop control device 9 in commercial available measurement systems. This can lead to incorrect open-loop control and/or closed-loop control of the movement of the movable element 20.

The open-loop and/or closed-loop control device 9 is connected to the transmitter 14 via a connection 16 in order to allow them to interchange data with one another. According to the invention, a first data item 12 is stored in the memory 8 when the sensor system 4 of the transmitter detects the reference mark 3 for the first time, wherein the first data item 12 is deleted if the external electrical power supply voltage Uv for the transmitter 14 fails and the first auxiliary supply voltage Um for the transmitter 14 fails. For the purposes of the exemplary embodiment, the first data item 12 is in this case stored in a non-volatile memory 28. In order to ensure that energy reserves are still available after a failure of the first auxiliary power supply device UH1 in order to allow the first data item 12 to be deleted in the non-volatile memory 28, the transmitter 14 has a second energy store 26, for example in the form of a capacitor, which produces a second auxiliary supply voltage 1412. However, the first data item 12 can also alternatively be stored in a volatile memory. In this case, there is no need for a second energy store 26 since, if the first auxiliary supply voltage UM fails, the volatile memory and therefore the first data item 12 are also deleted at the same time. At this point, it should be noted that, for the purposes of the invention, the expression deletion of a data item also means the data item being changed in the event of a power failure.

The open-loop and/or closed-loop control device 9 has a computation device 19 by means of which the open-loop and/or closed-loop control device moves the movable element appropriately. The computation device 19 may, for example, be in the form of a numerical controller (NC controller) for a machine. Furthermore, the open-loop and/or closed-loop control device 9 has a monitoring unit 15 which, for the purposes of the exemplary embodiment, is in the form of software which runs on the computation device 19. However, the monitoring unit may also be in the form of separate hardware on the open-loop and/or closed-loop control device 9.

If, for example, the open-loop and/or closed-loop control unit 9 is switched on again after having been switched off, and the external electrical supply voltage Uv is thus restored, then the first data item is transmitted from the transmitter 14 to the monitoring unit 15, and the monitoring unit 15 then compares the first data item 12 with a second data item stored in the computation unit 19, and an incorrectly determined position is identified if the first data item and the second data item do not match.

In the simplest case, the first data item comprises the binary number "1". When the transmitter is switched on for the first time, the first data item is in this case defined as being set to binary "0". When the sensor system 4 detects the reference mark 3 for the first time, the first data item 12 is stored in the transmitter, by setting it to "1". After a failure of the external electrical power supply Uv for the transmitter 14 or in the event of failure of the first auxiliary supply voltage Um for the transmitter 14, the first data item 12 is deleted, by setting it to binary "0". Once the external electrical supply voltage Uv has been restored, the first data item 12, that is to say the binary "0", is transmitted from the transmitter to the monitoring unit 15, and is compared by the monitoring unit 15 with a second data item 17, by checking whether the first data item 12 has a value of binary "0" or "1". At this point it should be noted that, for the purposes of the invention, a check as to whether the first data item has a value of binary "1" or binary "0" is understood to mean a comparison with a second data item 17 which, in this embodiment of the invention, has a value of binary "1". If the first data item 12 and the second data item 17 do not match, an incorrectly determined position is identified.

Figure 2:
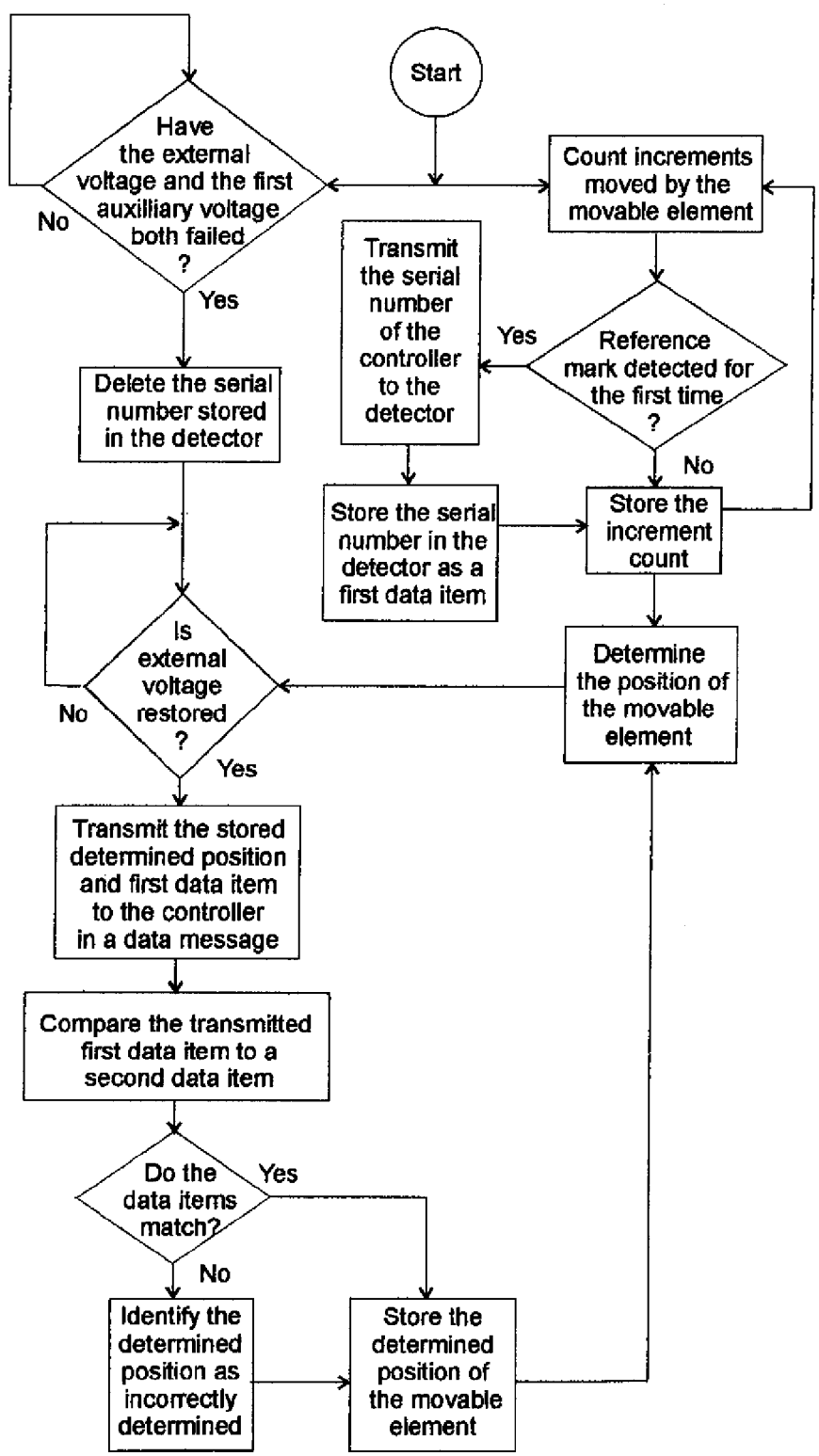
FIG. 2 is a flow chart showing a first embodiment of a measurement method according to the present invention.

The first and the second data item need not necessarily be in the form of a bit as described above, but may also comprise a number of digits and/or letters. For example, the second data item 17 may be in the form of the serial number of the computation device 19. The second data item 17 is stored in the computation device 19. The second data item 17 is then transmitted to the transmitter 14, where it is stored as the first data item 12 when the reference mark 3 of the transmitter 14 is detected for the first time. For example, when the open-loop and/or closed-loop control device 9 is subsequently switched off and is then switched on again, the first data item 12 is first of all transmitted to the open-loop and/or closed-loop control device 9, and in particular to the monitoring unit 15, in order to be compared there with the second data item 17, as shown in FIG. 2. If the first data item 12 and the second data item 17 do not match, an incorrectly determined position is identified since, in the meantime, the first auxiliary supply voltage$_{UH1}$ has then failed during the voltage failure of the external electrical supply voltage, and the count in the evaluation unit 7 could thus have been changed. In this case, the first data item 12 is preferably transmitted together with the determined position from the transmitter 14 to the open-loop and/or closed-loop control device 9 and in particular to the monitoring unit 15, for example within a data message.

Figure 3:
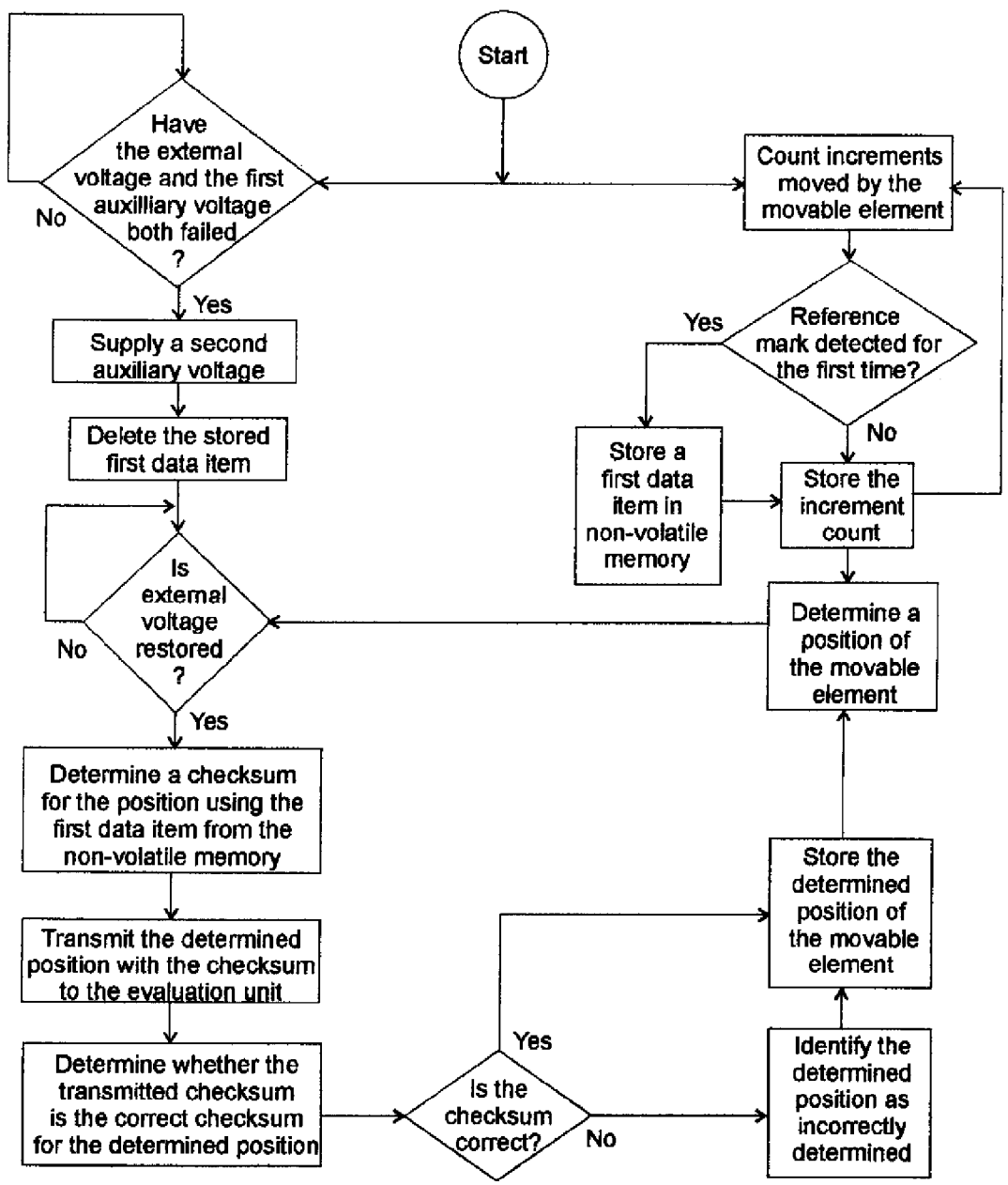
FIG. 3 is a flow chart showing a first embodiment of a measurement method according to the present invention.

As an alternative to the evaluation described above, the first data item 12 may, however, also be evaluated in the transmitter 14 itself, as shown in FIG. 3. In this embodiment of the invention, the evaluation unit 7 checks the first data item 12 once the external electrical supply voltage$_{UH1}$ has been restored and, if a deleted first data item is present, the determined position is deliberately transmitted by the evaluation unit 7 with an incorrect checksum to the monitoring unit 15, with the checksum being checked by the monitoring unit and an incorrectly determined position being identified in the case of an incorrectly identified checksum.

In this case, for example, the checksum may be a CRC checksum which is transmitted together with each transmitted position value to the open-loop and/or closed-loop control device 9.

By way of example, the reference mark may be detected for the first time when the measurement system is set up for the first time after delivery and installation of the machine.

At this point, it should be noted that only those elements of the transmitter 14 which are essential for understanding are illustrated in the figure. For example, the transmitter 14 may also have a plurality of incremental tracks and/or a plurality of sensor systems 4 for detection, for example, of a fine position (sine/cosine track signals) and a plurality of counters and a plurality of counts for detection of the ongoing increments. The first energy store 13 then in a corresponding manner supplies the memory 8 such that the individual counts are maintained if the external power supply voltage fails.

Furthermore, at this point, it should be noted that the first energy store 13 and/or the second energy store 26 may also be arranged outside the transmitter 14.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for monitoring accuracy of a measurement system having a transmitter to determine a position of a movable element, and a first energy store to supply a first auxiliary supply voltage to at least a part of the transmitter so that a count stored by the transmitter for determining a position of the movable element is maintained when an external electrical supply voltage supplied to the transmitter fails, said method comprising the steps of:
   storing a first data item when a reference mark is detected for the first time by the transmitter;
   deleting the stored first data item when the external electrical supply voltage and the first auxiliary supply voltage fail; and
   comparing the first data item to a second data item once the external electrical supply voltage has been restored, wherein the determined position is identified as an incorrectly determined position when the first data item and the second data item do not match.

2. The method of claim 1, wherein the first energy store supplies electrical power to an additional part of the transmitter so that increments that are moved after the external supply voltage fails are counted by the transmitter.

3. The method of claim 1, further comprising the step of transmitting the first data item to a monitoring unit once the external electrical supply voltage has been restored, wherein the transmitted first data item is compared to the second data item in the monitoring unit.

4. The method of claim 3, further comprising the step of transmitting the first data item together with the determined position to the monitoring unit when the first data item is transmitted to the monitoring unit.

5. The method of claim 1, further comprising the step of transmitting the second item to the transmitter so that the second data item is stored as the first data item when the reference mark is detected for the first time by the transmitter.

6. A method for monitoring accuracy of a measurement system having a transmitter to determine a position of a movable element, and a first energy store to supply a first auxiliary supply voltage to at least a part of the transmitter so that a count stored by the transmitter for determining a position of the movable element is maintained when an external electrical supply voltage supplied to the transmitter fails, said method comprising the steps of:
   storing a first data item when a reference mark is detected for the first time by the transmitter;
   deleting the stored first data item when the external electrical supply voltage and the first auxiliary supply voltage fail; and
   determining a checksum for the determined position, said checksum being an incorrect checksum when the first data item has been deleted, wherein the determined position is identified as an incorrectly determined position when an incorrect checksum is detected.

7. The method of claim 6, further comprising the step of transmitting the determined position and the checksum to an evaluation unit once the external electrical supply voltage has been restored, wherein the determined position is identified as an incorrectly determined position when an incorrect checksum is detected by the evaluation unit.

8. The method of claim 6, wherein the checksum is determined by calculating a CRC (Cyclic Redundancy Check) checksum.

9. A method for monitoring accuracy of a measurement system having a transmitter to determine a position of a movable element, and a first energy store to supply a first auxiliary supply voltage to at least a part of the transmitter so that a count stored by the transmitter for determining a position of the movable element is maintained when an external electrical supply voltage supplied to the transmitter fails, said method comprising the steps of:
   storing a first data item when a reference mark is detected for the first time by the transmitter;
   deleting the stored first data item when the external electrical supply voltage and the first auxiliary supply voltage fail; and
   supplying a second auxiliary supply voltage from a second energy store when the external electrical supply voltage and the first auxiliary supply voltage fail, for deleting the first data item.

10. A measurement system, Comprising:
   a transmitter storing a count representative of a position of a movable element, said transmitter being constructed to store a first data item when a reference mark is detected for the first time by the transmitter;
   a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail; and
   a second energy store supplying electrical power to at least a part of the transmitter when the external electrical supply voltage and the first energy store fail so that power is supplied for deleting the stored first data item.

11. The measurement system of claim 10, wherein the first energy store supplies electrical power to an additional part of the transmitter so that increments that are moved over after the external supply voltage fails are counted by the transmitter.

12. The measurement system of claim 10, wherein the first data item is a bit.

13. A measurement system, comprising:
- a transmitter storing a count representative of a position of a movable element, said transmitter being constructed to store a first data item when a reference mark is detected for the first time by the transmitter; and
- a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail,
- wherein the transmitter compares the first data item to a second data item once the external electrical supply voltage has been restored and identifies the determined position as an incorrectly determined position when the first data item and a second data item do not match.

14. The measurement system of claim 13, wherein the transmitter stores the second data item as the first data item when the reference mark is detected for the first time by the transmitter.

15. A measurement system, comprising:
- a transmitter storing a count representative of a position of a movable element, said transmitter being constructed to store a first data item when a reference mark is detected for the first time by the transmitter;
- a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail; and
- a monitoring unit receiving the first data item from the transmitter once the external electrical supply voltage has been restored, said monitoring unit comparing the first data item to a second data item in the monitoring unit and identifying the determined position as an incorrectly determined position when the first data item and the second data item do not match.

16. The measurement system of claim 15, wherein the transmitter stores the second data item as the first data item when the reference mark is detected for the first time by the transmitter.

17. The measurement system of claim 15, wherein the transmitter transmits the first data item to the monitoring unit together with the determined position.

18. The measurement system of claim 15, wherein the monitoring unit is a component of an open-loop control device for open-loop control of the movable element.

19. The measurement system of claim 15, wherein the monitoring unit is a component of a closed-loop control device for closed-loop control of the movable element.

20. The measurement system of claim 15 further comprising a control device, wherein the monitoring unit is included with an NC controller in the control device.

21. The measurement system of claim 15, wherein the monitoring unit is provided by a software program in a control device.

22. A measurement system, comprising:
- a transmitter storing a count representative of a position of a movable element, said transmitter being constructed to store a first data item when a reference mark is detected for the first time by the transmitter;
- a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail; and
- an evaluation unit receiving the determined position from the transmitter once the external electrical supply voltage has been restored, said determined position being transmitted with an incorrect checksum when the first data item has been deleted, wherein the determined position is identified as an incorrectly determined position when an incorrect checksum is detected by the evaluation unit.

23. A measurement system, comprising:
- a transmitter storing a count representative of a position of a movable element, said transmitter being constructed to store a first data item when a reference mark is detected for the first time by the transmitter; and
- a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail,
- wherein the first data item is a serial number of a control device that uses the position to control the movable element.

24. A machine, comprising: a measurement system which includes
- a transmitter storing a count representative of a position of a movable element and constructed to store a first data item when a reference mark is detected for the first time by the transmitter;
- a first energy store supplying a first auxiliary supply voltage to at least part of the transmitter sufficient to maintain the stored count in the event an external electrical supply voltage supplied to the transmitter fails, wherein the stored first data item is deletable, when the external electrical supply voltage and the first auxiliary supply voltage fail; and
- a monitoring unit receiving the first data item from the transmitter once the external electrical supply voltage has been restored, said monitoring unit comparing the first data item to a second data item in the monitoring unit and identifying the determined position as an incorrectly determined position when the first data item and the second data item do not match.

25. The machine of claim 24, wherein the machine is a machine tool, a production machine or a robot.

* * * * *